(12) United States Patent
Rajagopal et al.

(10) Patent No.: US 8,521,034 B2
(45) Date of Patent: Aug. 27, 2013

(54) APPARATUS AND METHOD FOR INTERFERENCE MITIGATION AND CHANNEL SELECTION FOR VISIBLE LIGHT COMMUNICATION

(75) Inventors: Sridhar Rajagopal, Plano, TX (US); Farooq Khan, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 704 days.

(21) Appl. No.: 12/584,135

(22) Filed: Sep. 1, 2009

(65) Prior Publication Data
US 2010/0215378 A1  Aug. 26, 2010

Related U.S. Application Data

(60) Provisional application No. 61/208,127, filed on Feb. 20, 2009.

(51) Int. Cl.
*H04B 10/00* (2006.01)
*H04B 10/08* (2006.01)
*H04J 14/02* (2006.01)

(52) U.S. Cl.
CPC .................... *H04J 14/0227* (2013.01)
USPC ................... 398/172; 398/25; 398/33

(58) Field of Classification Search
USPC .............. 398/118–131, 172, 25, 26, 33, 91
See application file for complete search history.

(56) References Cited

U.S. PATENT DOCUMENTS

| | | | |
|---|---|---|---|
| 7,756,181 B2 | 7/2010 | Kawanishi et al. | |
| 2002/0126334 A1* | 9/2002 | Milton et al. | 359/110 |
| 2006/0133813 A1* | 6/2006 | Ekkizogloy et al. | 398/135 |
| 2008/0095533 A1* | 4/2008 | Lee | 398/38 |
| 2008/0131140 A1 | 6/2008 | Shin et al. | |
| 2009/0269065 A1* | 10/2009 | Bardalai et al. | 398/79 |
| 2011/0069960 A1* | 3/2011 | Knapp et al. | 398/103 |

FOREIGN PATENT DOCUMENTS

| | | |
|---|---|---|
| JP | 2001-160647 | 6/2001 |
| JP | 2006-217492 | 8/2006 |
| JP | 2006-246085 | 9/2006 |
| JP | 2007-124404 | 5/2007 |
| JP | 2007-251864 | 9/2007 |
| JP | 2007-266795 | 10/2007 |
| JP | 2009-206840 | 9/2009 |
| KR | 1020080064425 A | 7/2008 |

OTHER PUBLICATIONS

International Search Report dated Sep. 17, 2010 in connection with International Patent Application No. PCT/KR2010/001057.

* cited by examiner

*Primary Examiner* — Dalzid Singh

(57) ABSTRACT

A device and method for device association, interference mitigation and channel selection for use in a visible light communication (VLC) network. The method includes transmitting on every one of a plurality of supported color channels of a first device to estimate an ambient interference on each supported color channel. The method also includes receiving a transmission on at least some of the supported color channels, where the number of receiving color channels is less than or equal to the number of supported color channels of the transmitter. The method further includes calculating a channel quality index for each of the receiving color channels. The method still further includes selecting at least one of the receiving color channels of the first device to be used as a communication channel. The method also includes reporting the at least one communication channel to a second device in the VLC network. In certain embodiments, the method includes establishing guard color channels for each of the supported color channels.

13 Claims, 10 Drawing Sheets

| CHANNEL | WAVELENGTH BAND (nm) | | SPECTRAL WIDTH (nm) | COLOR FROM CIE DIAGRAM | PROPOSED CODE |
|---|---|---|---|---|---|
| c1 | 380 | 450 | 70 | pB | 000 |
| c2 | 450 | 510 | 60 | B,BG | 001 |
| c3 | 510 | 560 | 50 | G | 010 |
| c4 | 560 | 600 | 40 | yG,gY,Y,yO,O | 011 |
| c5 | 600 | 650 | 50 | rO | 100 |
| c6 | 650 | 710 | 60 | R | 101 |
| c7 | 710 | 780 | 70 | R | 110 |
| c8 | | | | RESERVED | 111 |

APPARATUS AND METHOD FOR INTERFERENCE MITIGATION AND CHANNEL SELECTION FOR VISIBLE LIGHT COMMUNICATION

CROSS-REFERENCE TO RELATED APPLICATION(S) AND CLAIM OF PRIORITY

The present application is related to U.S. Provisional Patent Application No. 61/208,127, filed Feb. 20, 2009, entitled "INTERFERENCE MITIGATION AND CHANNEL SELECTION FOR VISIBLE LIGHT COMMUNICATION". Provisional Patent Application No. 61/208,127 is assigned to the assignee of the present application and is hereby incorporated by reference into the present application as if fully set forth herein. The present application hereby claims priority under 35 U.S.C. §119(e) to U.S. Provisional Patent Application No. 61/208,127.

TECHNICAL FIELD OF THE INVENTION

The present application relates generally to visible light communication and, more specifically, to a method and apparatus for interference mitigation and channel selection in visible light communication.

BACKGROUND OF THE INVENTION

Visible light communication (VLC) is a new technology for short-range optical wireless communication using visible light in optically transparent media. This technology provides access to several hundred terahertz (THz) of unlicensed spectrum. VLC is immune to the problems of electromagnetic interference and non-interference associated with Radio Frequency (RF) systems. VLC provides an additional level of security by allowing a user to see the transmission of data across the communication channel. Another benefit of VLC is that it augments and complements existing services (such as illumination, display, indication, decoration, etc.) from existing visible-light infrastructures. A VLC network is any network of two or more devices that engage in VLC.

FIG. 1 shows the full electromagnetic frequency spectrum, and a breakout of the wavelengths occupied by visible light. The visible light spectrum extends from approximately 380 to 780 nm in wavelength, which corresponds to a frequency range of approximately 400 to 790 THz. Since this spectrum is large and can support light sources with multiple colors, this technology can provide a large number of channels for communication.

SUMMARY OF THE INVENTION

A method for device association, interference mitigation and channel selection for use in a visible light communication (VLC) network is provided. The method includes transmitting on every one of a plurality of supported color channels of a first device to estimate an ambient interference on each supported color channel. The method also includes receiving a transmission on at least some of the supported color channels, where the number of receiving color channels is less than or equal to the number of supported color channels. The method further includes calculating a channel quality index (CQI) for each of the receiving color channels. The method still further includes selecting at least one of the receiving color channels of the first device to be used as a communication channel. The method also includes reporting the at least one communication channel to a second device in the VLC network. In certain embodiments, the method includes the design of guard color channels to assist with interference mitigation.

A device capable of device association, interference mitigation and channel selection for use in a visible light communication (VLC) network is provided. The device is configured to transmit on every one of a plurality of supported color channels to estimate an ambient interference on each supported color channel. The device is further configured to receive a transmission on at least some of the supported color channels, where the number of receive color channels is less than or equal to the number of supported color channels. The device is further configured to calculate a channel quality index (CQI) for each of the receiving color channels. The device is still further configured to select at least one of the receive color channels of the first device to be used as a communication channel. The device is also configured to report the at least one communication channel to a second device in the VLC network. In certain embodiments, the device is configured to mark certain channels as guard color channels during communication.

A method for mitigating light interference during VLC is provided. The method includes receiving a request from a receiving device to reduce a transmission power level on at least one color channel. The method also includes reducing the transmission power level on the at least one color channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged visible light communication network.

The following document is hereby incorporated into the present disclosure as if fully set forth herein: R. Ramirez-Iniguez, S. M. Idrus, Z. Sun, *Optical Wireless Communications: IR for Wireless Connectivity*, s.l.: CRC Press, 2008.

Figure 1:
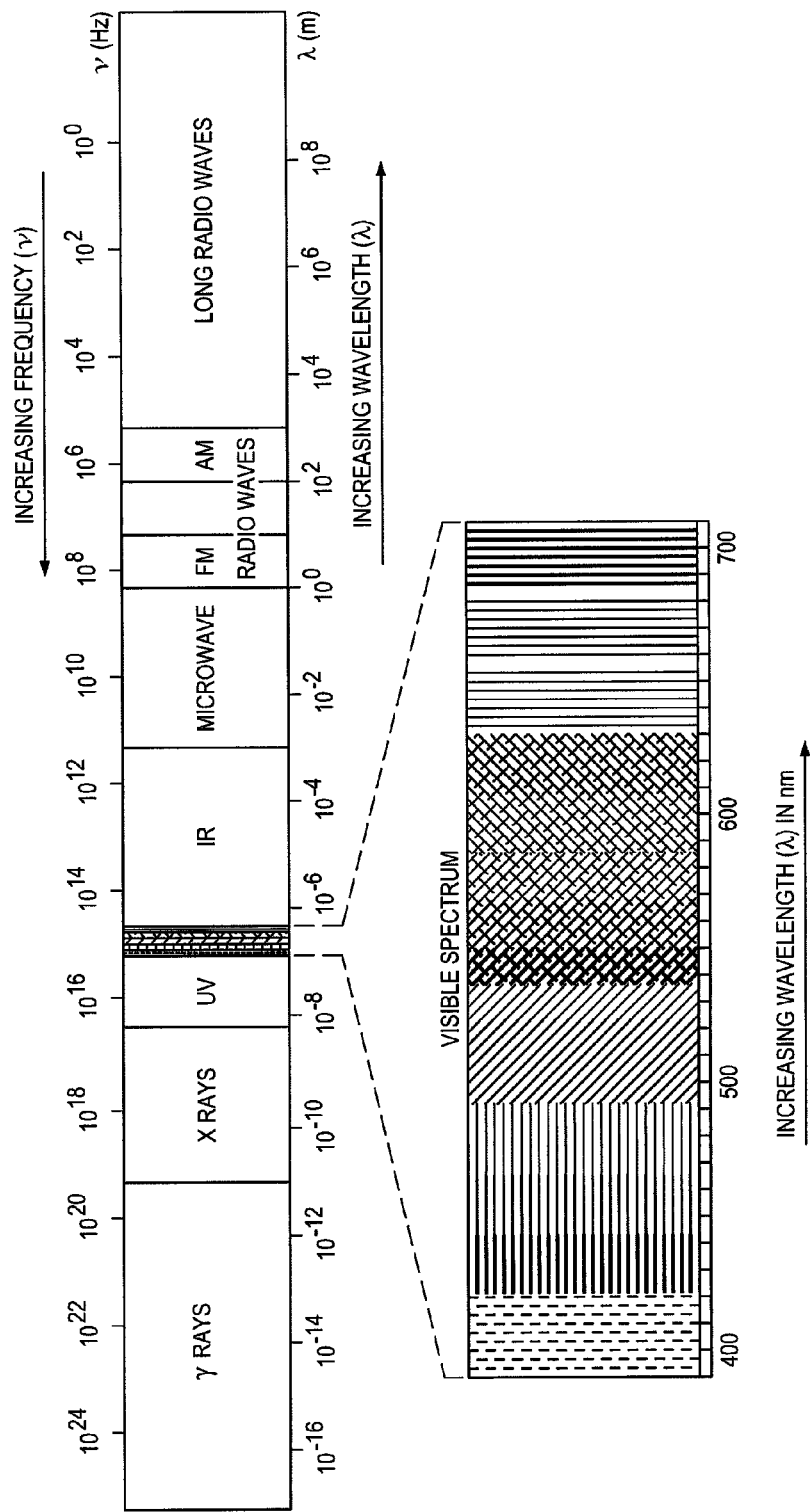
FIG. 1 illustrates a breakout of the wavelengths occupied by visible light in the full electromagnetic frequency spectrum.
Figure 2:
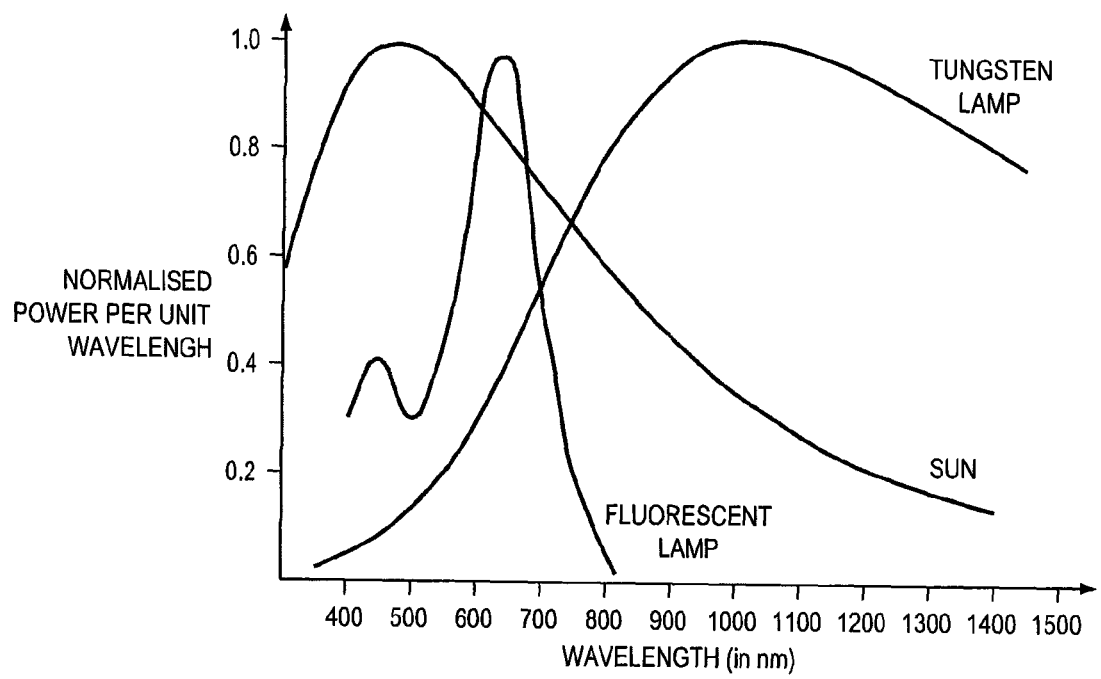
FIG. 2 shows a graph that depicts the frequency distribution of radiation from various light sources.

One of the major challenges with visible light communication is interference from ambient lighting in indoor and outdoor environments. For example, indoor lighting from sources such as fluorescent and incandescent lights can interfere with VLC. In outdoor environments, sunlight can be a significant source of interference. FIG. 2 shows a graph that depicts the frequency distribution of radiation from various light sources. As seen in the graph, sunlight and light from a tungsten lamp both possess a broad spectrum of wavelengths. VLC that transmits on a channel (band of wavelengths) anywhere in these spectra may be subject to interference from one or both of these sources. In contrast, light from a fluorescent lamp possesses a much narrower spectrum of wavelengths than either sunlight or tungsten lamp light. Therefore, it would be desirable to select a VLC channel that has minimal interference from ambient light. The directionality of the light sources and the receiving sensors, and their sensitivity to different parts of the frequency spectrum will also impact communication performance.

Given that the visible light spectrum is broad enough to permit many communication channels, it is desirable to select a communication channel, or channels, that exhibit optimal sensitivity for the light source and the receiving sensor, and the least interference from surrounding light sources.

While other forms of optical communication, such as infrared communication, have been considered, they have typically not supported multiple, parallel channels for communication. For example, interference across a particular channel has been mitigated by adding optical filters (lenses) that allow only the desired frequency to fall on the receiving sensor. However, this approach makes multi-channel communication difficult or impossible. Likewise, light interference between adjacent transmitters and receivers has hindered the development of full-duplex infrared transceivers. Accordingly, the Infrared Data Association (IrDA) supports only half-duplex modes due to self-interference between common transmitters and receivers. However, restricting communication to half-duplex modes limits the potential communication data rates.

Channel selection using multiple criteria such as range and interference has been studied for radio frequency (RF) based systems. For systems such as Bluetooth®, frequency hopping has been used to avoid interference from any specific frequency. Such methods cannot be readily applied to VLC in many cases. For example, certain light sources, such as traffic lights, are required to transmit a specific color. Other sources are capable of transmitting only one or two colors. All other colors (channels) are not supported in these devices. In addition, there may be physical limitations in optical sources and receiving sensors that make it difficult to change colors rapidly (i.e., frequency hop).

Thus, VLC provides a new challenge for communication under multiple channels (colors) in the presence of interference (ambient lighting). The present disclosure provides multiple methods to help mitigate interference and decide on the choice of channel(s) to be used for communication.

Figure 3:
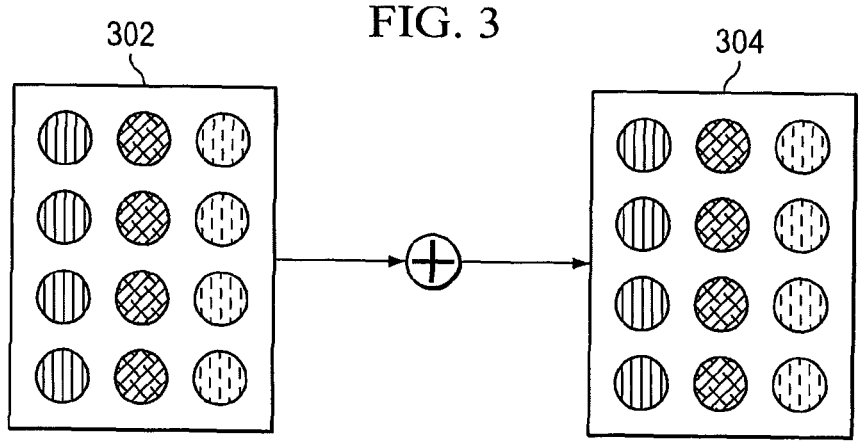
FIG. 3 depicts a system with two devices that communicate using VLC, according to one embodiment of the present disclosure.

FIG. 3 depicts a system with two devices that want to communicate using VLC, according to one embodiment of the present disclosure. The system includes a transmitter 302 and a receiver 304. Both the transmitter 302 and the receiver 304 support multiple light sources (e.g., LEDs, laser diodes, etc.) and sensors (e.g., photodiodes, image sensors, etc.). The transmitter 302 and receiver 304 can communicate with each other on multiple color channels (frequencies). At this time, it should be noted that while many of the embodiments described in the present disclosure utilize LEDs, it is understood that the present disclosure encompasses other types of light (e.g., incandescent, fluorescent, tungsten lamp, plasma, halogen, etc.) and other light sources (e.g., laser diodes, display monitors, illumination signboards, traffic lights, etc.) as well.

Since the actual peak wavelength and spectral width of a light source (e.g., an LED) can vary from manufacturer to manufacturer, it is important to have a broad range of bandwidth to suggest a particular color. If the bandwidths of adjacent channels are narrower than that of the light source, then the colors associated with the adjacent channels can interfere with each other, thus making it difficult to distinguish them at the receiver. Thus, the spectrum from 380-780 nm can be broken into multiple blocks for different color choices, and each block should include a band of sufficient width that a receiver is able to distinguish adjacent colors.

Figure 4:
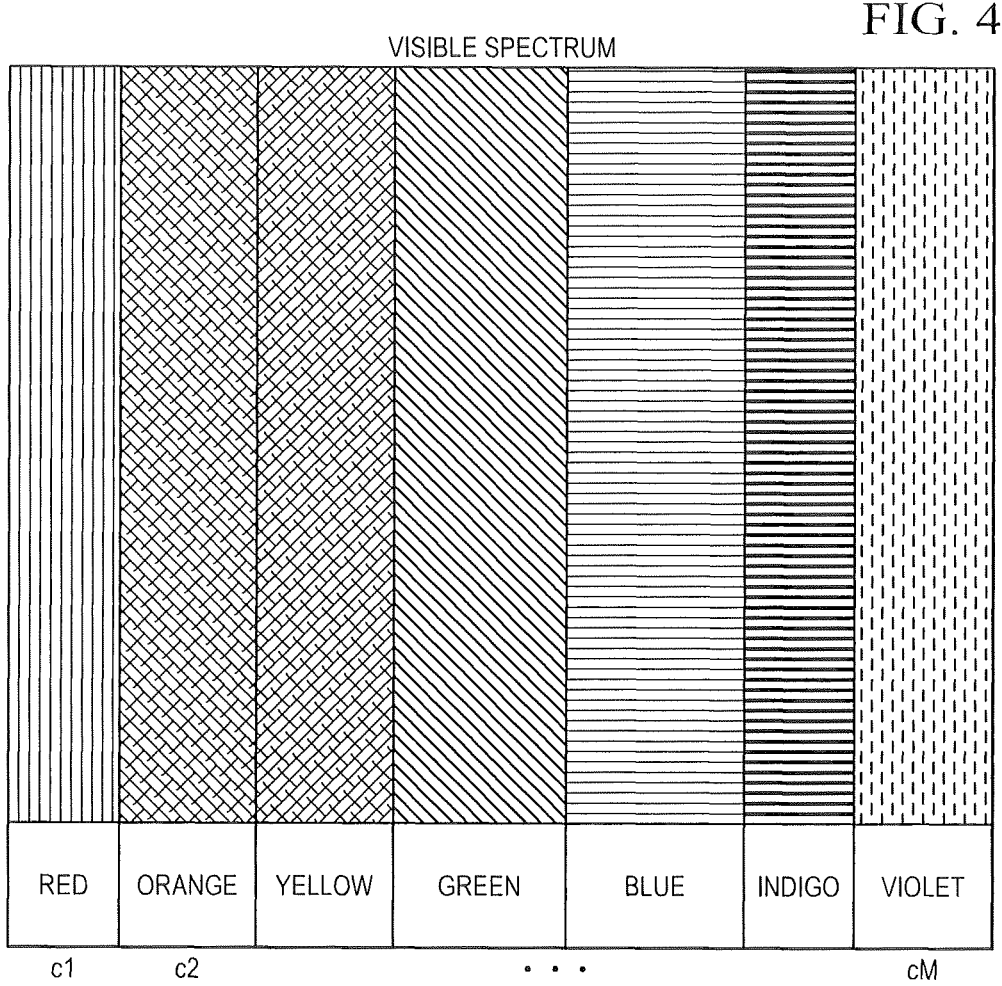
FIG. 4 depicts a division of the visible light spectrum into multiple channels or blocks for use in VLC, according to one embodiment of the present disclosure.

For example, FIG. 4 depicts a division of the visible light spectrum into M channels or blocks for use in VLC, such as communication between the transmitter 302 and the receiver 304, according to one embodiment of the present disclosure. For convenience, the channels have been labeled as c1 through cM. In certain embodiments, depending on the capabilities of the transmitter 302 and the receiver 304, it may be appropriate to divide the visible light spectrum into three to twelve color bands or channels. In other embodiments, more or fewer bands may be possible. In the embodiment depicted in FIG. 4, M equals seven.

One of the many benefits of using visible light for communication is the ability to take advantage of existing light sources, such as lamps providing ambient light, traffic lights and other signals, and LED signs. Since many existing light sources, such as LEDs, are manufactured with consideration to human color perception, these light sources may produce light in wavelength bands that are optimized for human eyes. Thus, depending on the light source, it may be appropriate or necessary in VLC to determine color channels as though a human eye is the receiver, even though the actual receiver in the communication may be a non-human device.

Figure 5:
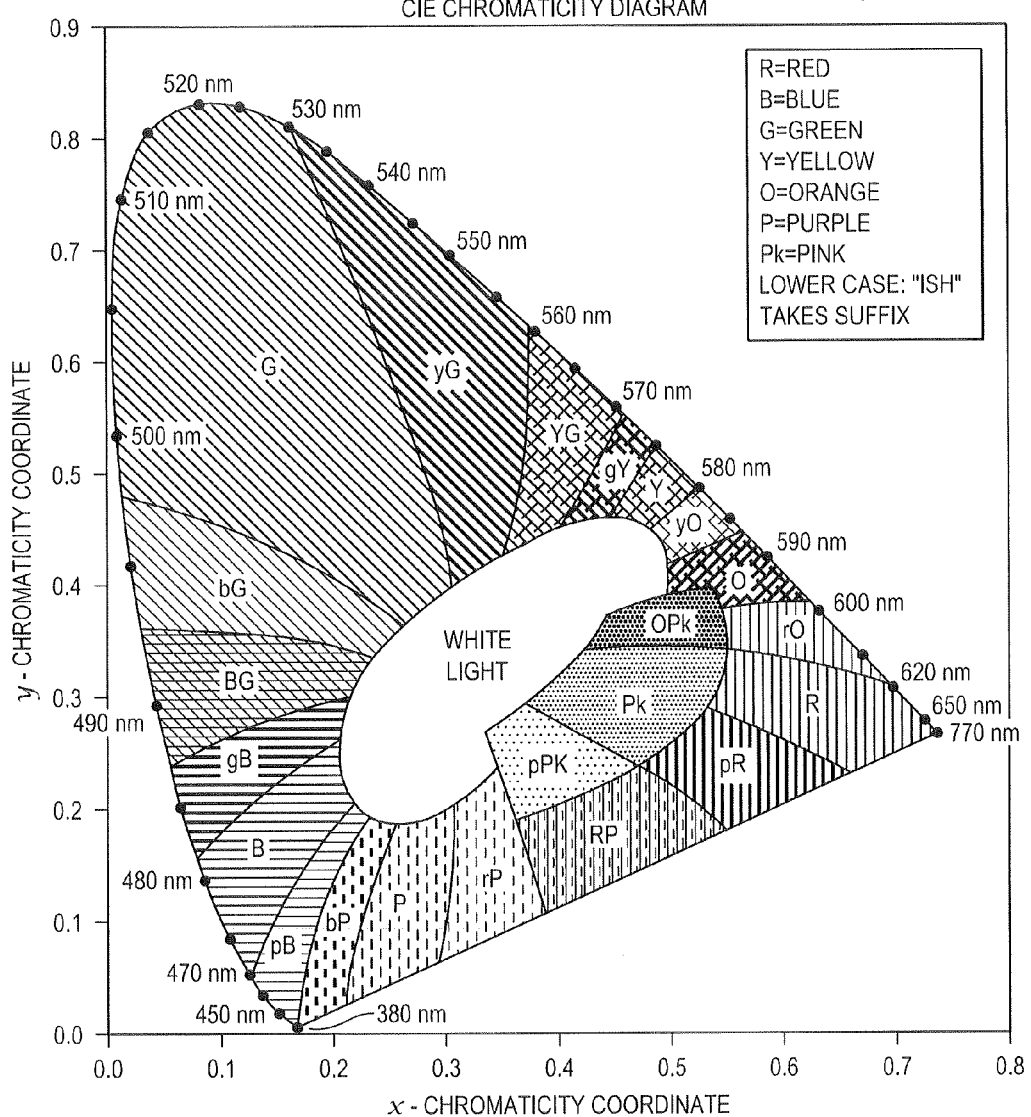
FIG. 5 depicts an International Commission on Illumination (C.I.E.) chromaticity diagram.
Figure 6:
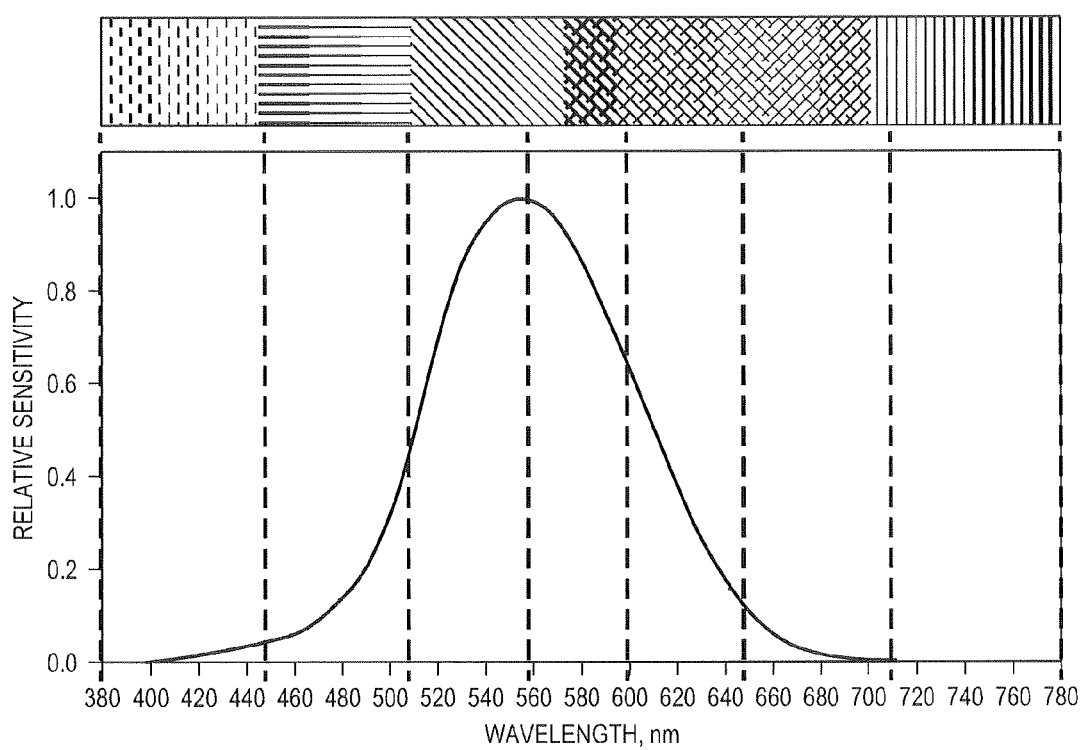
FIG. 6 shows a graph depicting the human eye response to visible light.

The number of channels and bandwidth of each channel may be determined in many different ways, such as by using an International Commission on Illumination (C.I.E.) chromaticity diagram as shown in FIG. 5, or a human eye response graph as shown in FIG. 6. As the bell curve in FIG. 6 illustrates, the human eye is more sensitive to colors at the center of the visible light spectrum (i.e., wavelengths associated with green and greenish colors) than colors at the ends of the spectrum. Thus, the human eye can detect differences in color across narrower wavelength bands in the center of the spectrum than at the ends of the spectrum. Therefore, LEDs that transmit colors in the center of the spectrum often use a narrower wavelength band than LEDs that transmit end colors.

Figure 7:
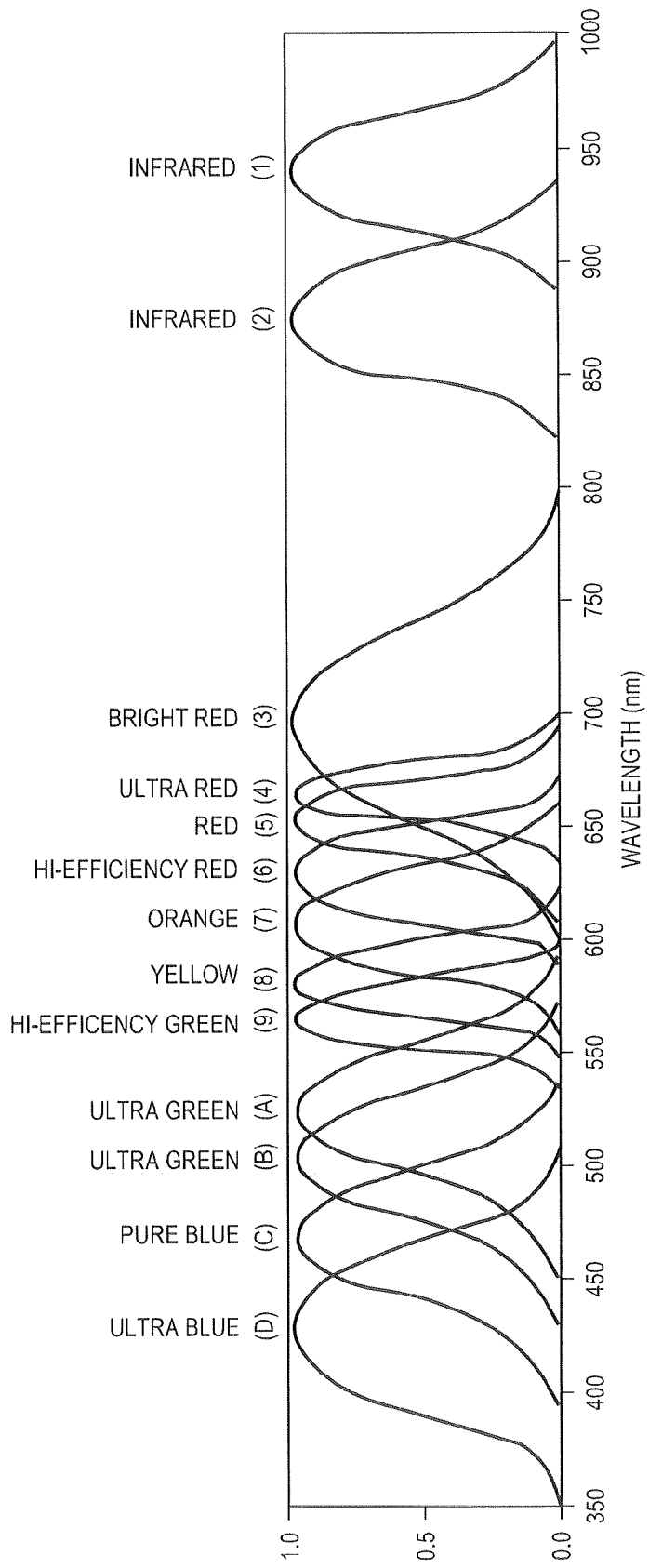
FIG. 7 shows a graph that depicts one example of the variation in spectral width and wavelength for different colors of LEDs.

FIG. 7 shows a graph that depicts one example of the variation in spectral width and wavelength for different colors of LEDs. As the graph illustrates, colors such as yellow and orange occupy a narrower spectral bandwidth than colors like ultra blue and bright red. Spectral width may also depend on the property of the materials used in the LED manufacturing process.

Figures 8, 10:
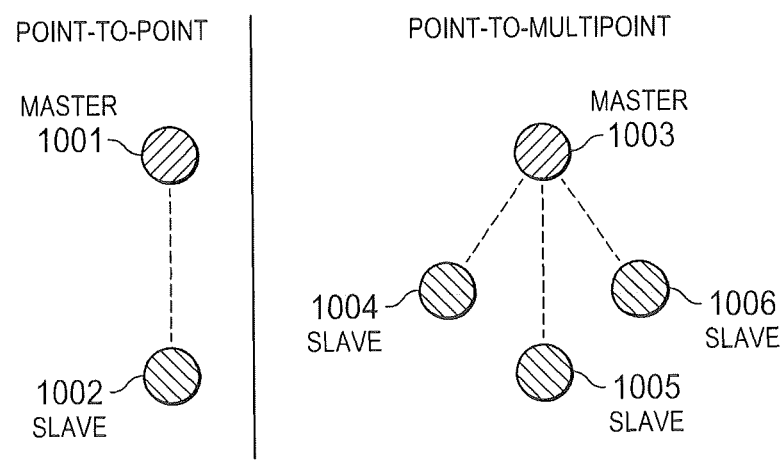
FIG. 8 shows a table of supporting data for VLC channels, according to one embodiment of the present disclosure.
FIG. 10 illustrates two typical piconet configurations.

Because of the differences in spectral width between LEDs, it may be appropriate or necessary to define VLC channels that vary in bandwidth. For example, in FIG. 6, dashed lines illustrate boundaries for VLC channels, according to one embodiment of the present disclosure. The table shown in FIG. 8 provides supporting data for each channel. Looking at the first row of the table, it is seen that channel c1 is defined as the band between 380 nm and 450 nm. Thus c1 has a spectral width of 70 nm. This band corresponds to the color purplish blue on the CIE chromaticity diagram in FIG. 5. The table also shows that the middle channels, c3 through c5, occupy a narrower spectral width than the other channels. This reflects the fact that the human eye is more sensitive to center colors, and therefore, many LEDs are manufactured with regard to this fact.

In order for communication devices, such as the transmitter 302 and receiver 304, to understand the communication capabilities of each device, as well as the communication capabilities of other nearby light sources and receivers, it may be desirable to represent each supported communication channel or color by a number or code. The last column of the table in FIG. 8 provides a code to represent each communication channel, according to one embodiment. In this embodiment, the proposed code is the binary representation of the number of the channel minus one. The use of codes is described in greater detail below.

Looking again at FIG. 7, it is seen that substantial variation in spectral width and wavelength exists between different types of LEDs. These variations may depend on the property of the materials used in the LED manufacturing process. Depending on the choice of LEDs, it is possible that the output of two LEDs could actually interfere with each other due to the overlap in spectral width. In such cases, it may be possible that only one of the LEDs can be used for transmission at a given time. For example, in FIG. 7, ultra green and pure blue may be restricted from communicating simultaneously.

Figure 9A:
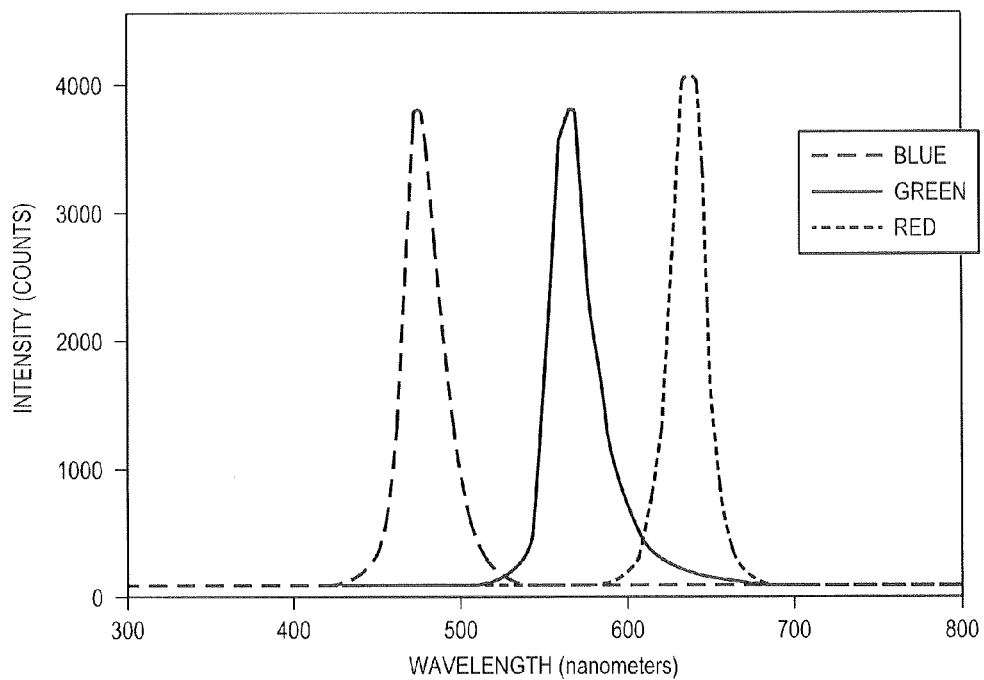
FIGS. 9A and 9B show graphs depicting the spectral distribution of a white LED.

Likewise, many LEDs do not support saturated colors, and may transmit in multiple bands. For example, the graph in FIG. 9A shows the spectral distribution of a white LED. The white light is actually created by transmitting blue, green, and red light simultaneously from the same LED. Each of the blue, green, and red lights is transmitted across a particular band, as shown in the graph. The right side of green light band leaks over into the red band, and the left side of the red band leaks over into the green band. Leakage between the blue and green bands is also present, but to a much lesser extent.

Significant variations in LED spectral width and peak wavelengths may occur between LEDs from different manufacturers, or even between LEDs from the same manufacturer. Additionally, peak wavelengths within a single LED can change with variations in the electrical current that powers the LED. These variations can make the leakage across bands more or less significant.

The output leakage from LED devices can not only affect the receiver of another device, it can also affect the receiver side of a transceiver device during frequency division duplexing (FDD) modes, which utilize simultaneous transmission and reception. For example, in the IrDA protocol for infrared transmission, when the emitter of a transceiver is activated and data is being transmitted, the detector of the same transceiver is deactivated. Once the emitter has finished sending data, the detector becomes active. The detector requires some time to stabilize to its normal state of high sensitivity.

The emitter and the detector are active one at a time in order to avoid interference within the same device. If both the emitter and the detector of an IrDA transceiver were allowed to operate at the same time, the energy emitted by the emitter could potentially be detected by its own detector due to the fact that both are contained within the same package and at a very short distance from each other. This makes it necessary to deactivate one when the other is activated. This operation mode, where transmission and reception do not occur simultaneously, is known as half-duplex. If, on the contrary, both the transmitter and the receiver are active at the same time and are allowed to operate simultaneously, the operation is classified as full-duplex. The IrDA protocol defines half-duplex operation only. However, the greater capacity potential of full-duplex operation makes it desirable for VLC.

The interference problems within a device associated with full-duplex communication might be mitigated to some extent by careful positioning of the receivers and light sources in the device. However, channel interference due to spectral leakage may still affect the performance of two devices when both are transmitting at the same time. Therefore, when two or more devices want to communicate, it may be advantageous to provide detailed information about the channels supported by each device to assist with channel selection.

In order to support full-duplex communication, such as in FDD operations, one advantageous embodiment defines "guard color" channels for each channel used for transmission. A guard color channel (or simply "guard color") is a channel or band of wavelengths in which VLC cannot occur simultaneously with VLC in another channel. For every color (or channel) "c" that is used for transmission, a list of guard colors (or channels) "g" is defined. The guard colors "g" cannot be used simultaneously, for either transmitting or receiving data, when channel "c" is in use for transmission.

The criteria used for defining a guard color can vary between embodiments. In certain embodiments, guard colors may be defined based on out-of-band leakage, exceeding a certain value (for example, 10-20 dB) over the in-channel value that causes a considerable loss in receiver sensitivity in those channels.

Figure 9B:
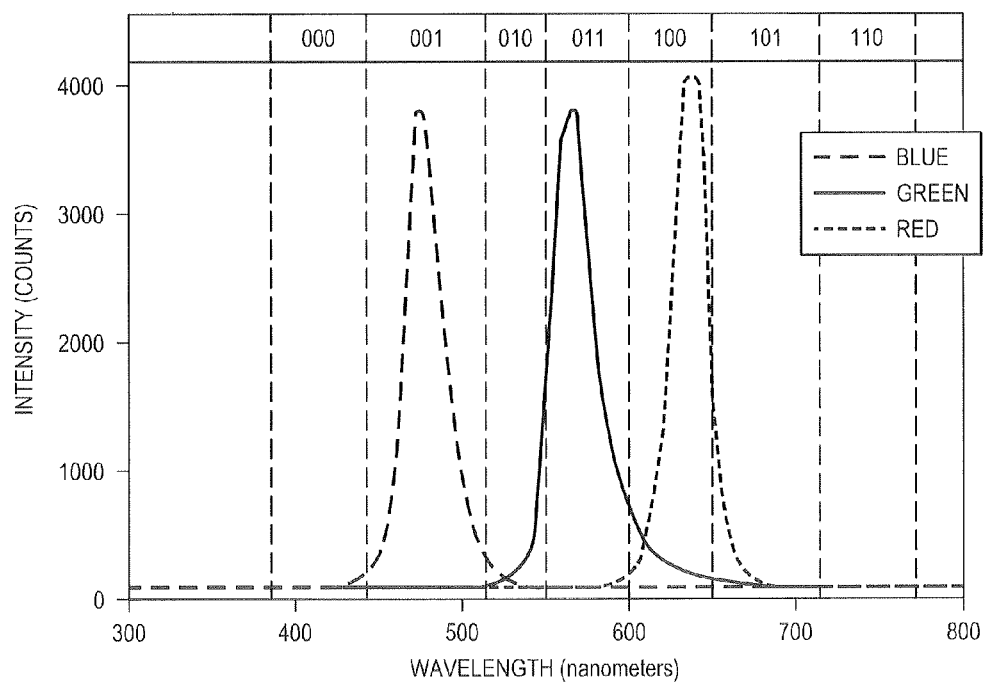

The graph in FIG. 9B depicts the spectral distribution of a white LED as shown in FIG. 9A. Superimposed on the graph are dotted lines that show the boundaries of the channels defined in the table in FIG. 8. At the top of each defined channel in FIG. 9B is the three digit binary code for the channel, as shown in the far right column of FIG. 8.

It can be seen in the graph in FIG. 9B that the vast majority of the spectral distribution of the blue light falls in the channel designated 001. Very little of the blue light is transmitted in adjacent channels 000 and 010. Since almost all of the blue light is transmitted in one channel (channel 001), there may be no benefit to defining guard color channels for channel 001, since interference is unlikely to occur.

In contrast, consider the green and red lights in FIG. 9B. Although most of the spectral distribution of the green light falls in channel 011,there is a noticeable amount of bleeding, or leakage, into channels 010 and 100. Accordingly, it may be beneficial for interference avoidance to define channels 010 and 100 as guard color channels for the green light. By defining the guard color channels, it is assured that no VLC will occur in channels 010 and 100 when VLC takes place in channel 011. Likewise, the red light is transmitted primarily in the 100 channel. However, there is a significant amount of leakage into the 101 channel. Thus, channel 101 may be defined as a guard color channel for channel 100.

The guard colors are defined on a per channel basis. Thus channel 011 has its own guard colors, and channel 100 has its own guard colors. In certain embodiments, the codes for the guard colors are transmitted from transmitter to receiver as part of the process for establishing the VLC channels. In some embodiments, each guard color may be communicated as a three digit code as described above. In other embodiments, each guard color could be represented as part of an N-bit number with a "1" in the bit location corresponding to each guard color. For example, eight channels are defined in the table in FIG. 8. For the green light of FIG. 9B, the guard colors are 010 and 100,which are the third and fifth channel. Therefore, the guard colors for the green light could be communicated as an eight-bit number with a "1" in the third and fifth bits: 00101000.

For personal area networks, devices can connect in an ad hoc manner. A piconet is formed when at least two devices, such as a laptop and cell phone, connect. When a piconet is formed, one of the devices can act as a master and the others can act as slaves for the duration of the connection. FIG. 10 illustrates two typical piconet configurations. When only two devices connect, such as device 1001 and 1002, it is called a peer-to-peer topology or point-to-point topology. When there are multiple devices connected to a single master, such as devices 1004-1006 connecting to master 1003, it is called a star topology or point-to-multipoint topology. It should be understood that while certain embodiments of the present disclosure are described with reference to piconets, such a reference is for example purposes only, and should not be construed to limit the disclosure to such a network.

To better explain channel selection and interference mitigation in VLC, it may be advantageous to define certain variables. Let S be the number of light sources and R be the number of receiving sensors in a device. Let N be the total number of colors available. Let M be the number of colors (or channels) supported by the device.

Without loss of generality, assume that each light source and sensor can support only 1 color. Multiple light sources of the same color can be used to increase the intensity of transmitted light from the device. Assume that the number of light sources and sensors is greater than or equal to the number of colors supported by the device. Thus, $S \geq M$ and $R \geq M$. Further assume that all light sources of the same color transmit the same information, as intensity modulation is the typical form of modulation used for light sources. For notational purposes, a subscript will be assigned to each device. Thus, with reference to the point-to-point piconet in FIG. 10, device 1001 will have $S_1$ sources, $R_1$ receiving sensors, and $M_1$ colors. Likewise, device 1002 will have $S_2$ sources, $R_2$ receiving sensors, and $M_2$ colors. Let K be the number of channels available for communication between the two devices. Thus, $K=M_1 \cap M_2$.

We further define a color (channel) quality index (CQI) that provides an estimate of the channel quality. The CQI is used to help with channel selection and is typically determined by getting an estimate of the channel signal to noise ratio, for example, by transmitting known channel estimation sequences in the physical layer. We also define RX CQI and TX CQI. RX CQI is defined for the receiver, and provides the CQI for transmissions from the transmitter (e.g., device 1001) to the receiver (e.g., device 1002). Since the channel between the two devices is very directional and not necessarily symmetric, we also define TX CQI (e.g., from device 1002 to device 1001), which is obtained based on the feedback from the receiver (device 1002) back to the original transmitter (device 1001).

Figure 11:
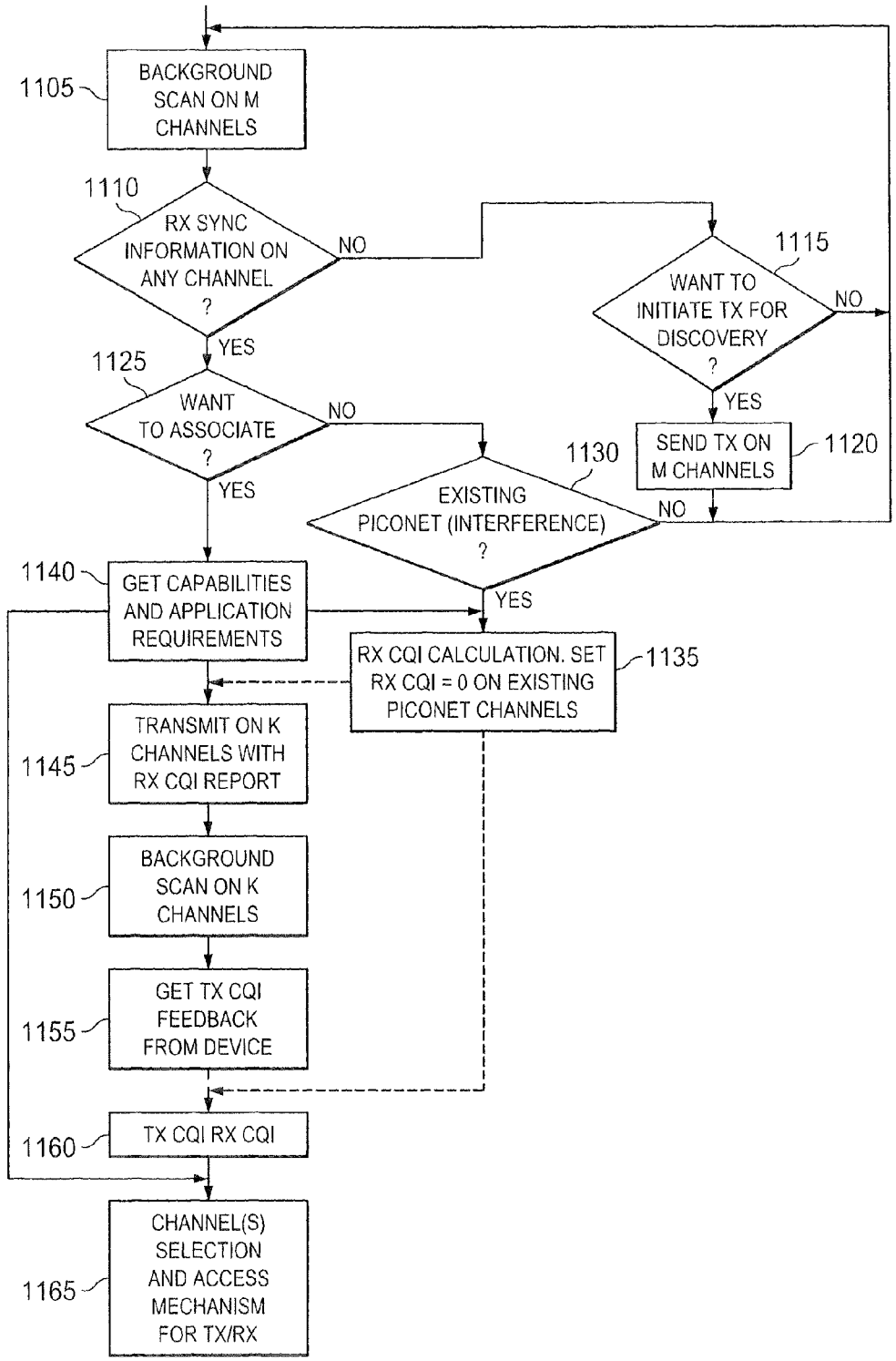
FIG. 11 depicts a method for device association and channel selection on a per device basis, according to one embodiment of the present disclosure.

FIG. 11 depicts a method for device association and channel selection on a per device basis, according to one embodiment of the present disclosure. The method is described with reference to the point-to-point piconet in FIG. 10, but may be used with other VLC networks (e.g., networks with a star topology) by connecting one node at a time. In certain embodiments, the method may be performed by any or all of devices 1001-1006 in FIG. 10.

Initially, device 1001 performs a background scan on all supported color channels to see if there are any transmissions presently occurring on any of the supported color channels (step 1105). If device 1001 is not able to detect transmissions on any channel (step 1110), then device 1001 may decide to initiate a device discovery process (step 1115). This is done by sending transmissions on all M supported color channels (step 1120), after which device 1001 returns to the background scan mode to look for responses (step 1105).

Alternatively, if device 1001 is able to hear at least one transmission with the synchronization information (step 1110), it may try to associate with the source of that transmission (e.g., device 1002) (step 1125). If device 1001 does not want to associate with device 1002, or if the channel is currently associated with another piconet, the device may mark that channel as unusable for receiving due to interference (step 1130). This is done by setting a RX CQI equal to zero (step 1135).

Returning to step 1125 in the above example, if device 1001 hears a transmission from device 1002 and wants to associate, it receives the capabilities, guard color information and application requirements of device 1002 in the association request that could be sent in the beacon or reception synchronization information (step 1140). For each of the supported channels from device 1002, the RX CQI is calculated (step 1135). Note that setting the RX CQI to 0 (step 1130) for any interference channel takes precedence in this request. The RX CQI is then transmitted along with the capabilities and application requirements of device 1001 (from step 1140) on the K common supported channels between devices 1001 and 1002 (step 1145).

After this transmission, device 1001 goes back into scan mode (step 1150) and gets the TX CQI from device 1002 based on the transmission of the previous step (step 1155). The TX CQI and RX CQI information is then collected at the master/host device (either device 1001 or device 1002, depending on the device which initiated the transmission and hence, shown with dotted lines) (step 1160). The TX and RX CQI information is then combined with any application requirements such as needed for high data rates etc. (step 1140) to make a final decision on the channel(s) for communication and the access mechanism such as FDD or Time Division Duplexing (TDD) (step 1165).

Figure 12:
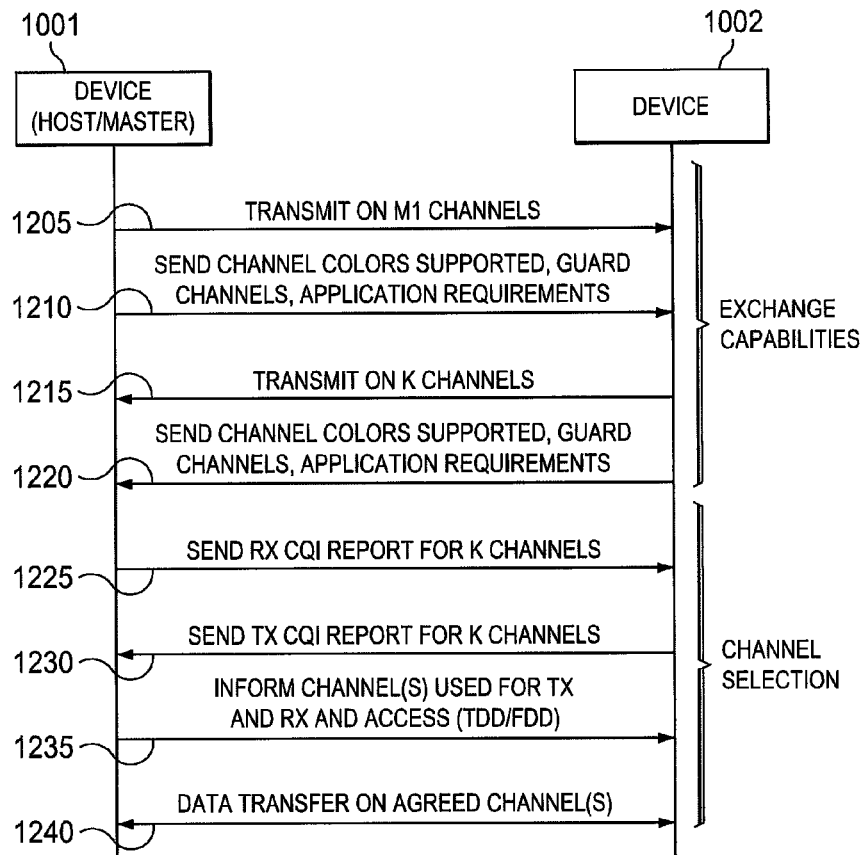
FIG. 12 depicts a method for device association and channel selection between the devices, highlighting the steps involved in communication between the devices, according to one embodiment of the present disclosure.

FIG. 12 depicts a method for device association and channel selection between the devices, highlighting the steps involved in communication between the devices, according to one embodiment of the present disclosure. The method is described with reference to the point-to-point piconet in FIG. 10, but may be used with other VLC networks (e.g., networks with a star topology). In certain embodiments, the method may be performed by any or all of devices 1001-1006 in FIG. 10.

First, device 1001, which often acts as the host or master and initiates the communication, transmits on all supported $M_1$ channels (step 1205). Since there is independent hardware for each color at the transmitter and receiver, parallel transmissions are possible as long as guard color channels are not used for any particular color choice.

In certain embodiments, a Medium Access Controller (MAC) of each device may communicate the capabilities of each device and application requirements. This information could be provided in various ways, such as in an information element or a header. The MAC may also report the number of supported channels and the associated guard colors for each channel for the device during device discovery on each transmitted color channel (step 1210).

Next, device 1002 attempts to receive and synchronize on all K channels shared between the devices. However, it may be able to receive on only 'x' channels, where $1 \leq x \leq K$, due to interference with other light sources. Device 1002 must receive on at least one channel in order to communicate. The K channels and device capabilities are obtained from the information mentioned in the information element or header obtained while communicating using 'x' channels. Based on the interference energy from ambient light and the energy received during transmission, a CQI is calculated for all K channels. Device 1002 then transmits on all K common channels to device 1001 (step 1215). Device 1002 also provides its supported channels, guard channels and application requirements as part of its capabilities information exchange (step 1220).

Next, device 1001 attempts to receive and synchronize on all K channels. It may receive on only 'y' channels, where $1 \leq y \leq K$, due to interference. Since VLC is very directional, it is possible that 'x' and 'y' may be different. For example, if device 1001 is closer to a window, it may receive more ambient light interference than device 1002. Device 1001 calculates its RX CQI for all K channels as well and transmits the CQI report back to device 1002 (step 1225).

At approximately the same time, device 1002 calculates the CQI metrics based on the received information from device 1001. Channels where reception is not possible or where other piconets are known to operate by device 1002 will be tagged unusable with a reception CQI of 0. Device 1002 then reports this RX CQI for all K channels back to device 1001 (step 1230).

One of the devices, often the master device 1001, collects the information for the transmission such as the transmission and reception capabilities of the two devices, the CQI reports, the selected guard color channels for each channel and the requirements of the application. Based on this information, device 1001 determines a single or multiple channels for communication. Device 1001 then reports the communication channels to device 1002 (step 1235). Thus, at the end of this exchange, both devices have an estimate of the CQI for their transmissions that is most suitable for reception at the other end. From that point, devices 1001 and 1002 can communicate on the agreed channel or channels (step 1240).

The access mechanism chosen for communication can also depend on the information obtained from the exchange. For example, if there is only a single channel available, or if all channels need to be used for high data rates, TDD would be required. On the other hand, if the channel interference is asymmetric, and different channels are needed for transmission and reception, then FDD may be preferred. The final selection choice can be implementation-dependent.

Although the aforementioned methods were described with reference to piconets containing essentially static devices, it is contemplated that VLC may be beneficial in networks where the devices are moving with respect to each other. For example, a moving automobile may engage in VLC with a traffic light. Alternatively, two vehicles that are approaching each other may engage in VLC through their headlights. VLC involving automobiles may include information about traffic conditions, road construction, weather, or any other traffic-related or non-traffic-related information. Because of the short time in which a moving automobile is in visual contact with another vehicle or traffic signal, it is important that the devices be able to quickly associate and select channels for communication. One method to achieve rapid association is to transmit between devices on all available channels in parallel.

The methods of association and channel selection described above were discussed with reference to two devices. For VLC systems with more than two devices, additional mechanisms can be used in a system to mitigate interference between multiple VLC devices. These mechanisms will be discussed now.

Figure 13:
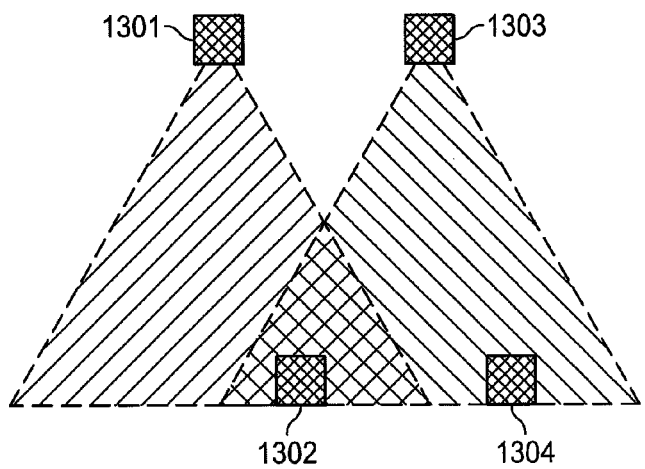
FIG. 13 illustrates interference between two piconets that is solved according to one embodiment of the present disclosure.

FIG. 13 illustrates interference between two piconets that is solved according to one embodiment of the present disclosure. Devices 1301 and 1302 form one piconet. Devices 1303 and 1304 form a second piconet. Device 1302 receives data transmitted from device 1301, but also receives interference from device 1303. One option to correct the interference is for device 1302 to report a CQI of 0 for that channel to device 1301. Then devices 1301 and 1302 can select a different channel to communicate. However, there may be situations where this is not desirable. For example, device 1301 may not have multiple color channels for communication. Alternatively, device 1301 may have multiple color channels, but may require every channel for a high data rate link to device 1302.

In such cases, several alternatives may be possible to mitigate interference. If device 1302 can synchronize to device 1303, it can request device 1303 to choose an alternate color (channel). This can be done through a channel or color change request mechanism. Device 1302 may also request device 1303 to reduce its transmit light power. Thus, transmit light control can be used in certain cases to reduce interference.

Transmit light control can be accomplished in various ways. In one embodiment, the current to the device 1303 could be reduced. In another embodiment, if device 1303 uses multiple light sources of the same color for transmission, some of the light sources could be turned off. In yet another embodiment, the power duty cycle of each LED in device 1303 could be changed in the physical layer by using a different pulse width modulation or channel coding scheme technique which has a lower duty cycle. If device 1301 and device 1303 can communicate with each other (through VLC, a wired or wireless backplane, or some other method), then device 1301 could use these mechanisms for making a request to device 1303 to change color (channel), apply transmit light control, or both.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a visible light communication (VLC) network, a method for device association, interference mitigation and channel selection, the method comprising:
    transmitting on every one of a plurality of supported color channels of a first device to estimate an ambient interference on each supported color channel;
    collecting a transmit channel quality index (TX CQI) report, wherein the TX CQI report includes a TX CQI for each of a plurality of receiving color channels of a second device;
    selecting one of the supported color channels of the first device to be used as a transmit communication channel by the first device based on the TX CQI;
    receiving a transmission from the second device on at least some of the supported color channels of the first device, where a number of the color channels on which the transmission is received is less than or equal to a number of the supported color channels of the first device;
    calculating a receive channel quality index (RX CQI) for each of the color channels of the first device on which the transmission was received;
    selecting at least one of the color channels of the first device on which the transmission was received to be used as a receive communication channel by the first device based on the RX CQI; and
    reporting the at least one receive communication channel to the second device in the VLC network.

2. The method as set forth in claim 1, further comprising:
    establishing at least one guard color channel for at least one of the color channels within the selected receive communication channel of the first device.

3. The method as set forth in claim 2, wherein selection of one or more of the transmit and receive communication channels is based on at least one of: the TX CQI and the RX CQI of the color channels, transmission and reception capabilities of the first and second devices, the at least one guard color channel, and an access mechanism of the VLC.

4. The method as set forth in claim 1, further comprising:
    performing a background scan of the supported color channels to detect any transmissions;
    upon detecting an undesirable transmission, choosing not to associate with a source of the undesirable transmission; and
    marking a color channel on which the undesirable transmission was detected as unusable.

5. The method as set forth in claim 1, wherein the first and second devices are configured to communicate with each other across multiple visible light channels.

6. The method as set forth in claim 1, wherein the first device is configured to receive transmissions from the second device while in motion with respect to the second device.

7. The method as set forth in claim 1, wherein selection of at least one color channel for the transmit or receive communication channel is based on the TX CQI or the RX CQI of the respective color channel.

8. For use in a visible light communication (VLC) network, a method for device association, interference mitigation and channel selection, the method comprising:
    transmitting on every one of a plurality of supported color channels of a first device to estimate an ambient interference on each supported color channel;
    receiving a transmission on at least some of the supported color channels, where a number of receiving color channels is less than or equal to the number of supported color channels;
    calculating a channel quality index (CQI) for each of the receiving color channels; selecting at least one of the receiving color channels of the first device to be used as a communication channel;
    reporting the at least one communication channel to a second device in the VLC network;
    establishing at least one guard color channel for at least one of the receiving color channels of the first device;
    dividing at least a part of the visible light spectrum into wavelength bands;
    defining a plurality of communication channels, each communication channel associated with one of the wavelength bands in the visible light spectrum;
    assigning a code to each wavelength band that is supported by the first device for VLC;
    assigning a code to each of the at least one guard color channel; and
    communicating the code of each supported wavelength band and the code of each of the at least one guard color channel to the second device.

9. For use in a visible light communication (VLC) network, a device capable of device association, interference mitigation and channel selection, the device configured to:
    transmit on every one of a plurality of supported color channels to estimate an ambient interference on each supported color channel;
    collect a transmit channel quality index (TX CQI) report, wherein the TX CQI report includes a TX CQI for each of a plurality of receiving color channels of a second device;
    select one of the supported color channels of the first device to be used as a transmit communication channel by the first device based on the TX CQI;
    receive a transmission from the second device on at least some of the supported color channels, where a number of the color channels on which the transmission is received is less than or equal to a number of the supported color channels;
    calculate a receive channel quality index (RX CQI) for each of the color channels of the first device on which the transmission was received;
    select at least one of the color channels of the first device on which the transmission is received from the second device to be used as a receive communication channel by the first device based on RX CQI; and
    report the at least one receive communication channel to the second device in the VLC network.

10. The device as set forth in claim 9, the device further configured to:
    establish at least one guard color channel for at least one of the color channels selected for the receive communication channel.

11. The device as set forth in claim 10, wherein selection of one or more of the transmit and receive communication channels is based on at least one of: the TX CQI and the RX CQI of the color channels, transmission and reception capabilities of the first and second devices, the at least one guard color channel, and an access mechanism of the VLC.

12. The device as set forth in claim 9, the device further configured to:
   perform a background scan of the supported color channels to detect any transmissions;
   upon detection of an undesirable transmission, choose not to associate with a source of the undesirable transmission; and
   mark a color channel on which the undesirable transmission was detected as unusable.

13. The device as set forth in claim 9, the device further configured to communicate with the second device across multiple visible light channels.

* * * * *